(12) United States Patent
Reddy et al.

(10) Patent No.: US 7,007,752 B2
(45) Date of Patent: *Mar. 7, 2006

(54) WELL TREATMENT FLUID AND METHODS WITH OXIDIZED POLYSACCHARIDE-BASED POLYMERS

(75) Inventors: B. Raghava Reddy, Duncan, OK (US); Larry S. Eoff, Duncan, OK (US); Eldon D. Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/727,365

(22) Filed: Dec. 4, 2003

(65) Prior Publication Data

US 2004/0182576 A1    Sep. 23, 2004

Related U.S. Application Data

(63) Continuation-in-part of application No. 10/394,461, filed on Mar. 21, 2003.

(51) Int. Cl.
    *E21B 43/00*    (2006.01)
(52) U.S. Cl. .................... 166/285; 166/294; 166/305.1
(58) Field of Classification Search ................ 166/285, 166/294, 300, 305.1; 507/203, 209, 211, 507/212, 214, 225
    See application file for complete search history.

(56) References Cited

U.S. PATENT DOCUMENTS 4,487,867 A * 12/1984 Almond et al. ............... 524/42
5,208,216 A * 5/1993 Williamson et al. ......... 507/120
5,322,123 A * 6/1994 Kohler et al. ................ 166/295
5,836,392 A   11/1998 Urlwin-Smith ............. 166/295
6,258,755 B1  7/2001 House et al. ............... 507/110
6,267,893 B1  7/2001 Luxemburg .................. 210/723
6,291,404 B1 * 9/2001 House ........................ 507/110
6,358,889 B1 * 3/2002 Waggenspack et al. ..... 507/110
6,764,981 B1 * 7/2004 Eoff et al. ................... 507/110

* cited by examiner

*Primary Examiner*—John Kreck
(74) *Attorney, Agent, or Firm*—Robert A. Kent; Crutsinger & Booth

(57) ABSTRACT

The present invention provides a well treatment fluid for use in a well, the well treatment fluid comprising water; an amine-based polymer; an polysaccharide-based polymer; and an oxidizing agent that is capable of at least partially oxidizing at least the polysaccharide-based polymer. The present invention also provides a method of treating a subterranean formation penetrated by a wellbore, the method comprising the steps of: (a) forming a well treatment fluid comprising water; an amine-based polymer; a polysaccharide-based polymer; and an oxidizing agent that is capable of at least partially oxidizing at least a portion of the polysaccharide-based polymer; and (b) contacting the well treatment fluid with the subterranean formation. The present invention also provides a method of treating a subterranean formation penetrated by a wellbore, the method comprising the steps of: (a) forming a well treatment fluid comprising water; an amine-based polymer; and a polysaccharide-based polymer; (b) contacting the subterranean formation with the well treatment fluid; and (c) contacting the subterranean formation with an oxidizing agent that is capable of at least partially oxidizing at least a portion of the polysaccharide-based polymer in the well treatment fluid present therein.

47 Claims, No Drawings

WELL TREATMENT FLUID AND METHODS WITH OXIDIZED POLYSACCHARIDE-BASED POLYMERS

CROSS-REFERENCE TO RELATED APPLICATION

This is a continuation in part of copending U.S. application Ser. No. 10/394,461, entitled "Well Treatment Fluid and Methods with Oxidized Polysaccharide-Based Polymers," filed on Mar. 21, 2003.

FIELD OF THE INVENTION

The present invention generally relates to the field of methods for well stimulation or other treating of subterranean formations. More specifically, the invention is directed to methods to control water production and thereby enhance the production of oil or gas.

BACKGROUND OF THE INVENTION

As hydrocarbon-producing wells mature, water production becomes a serious problem. Remediation techniques for controlling water production are generally referred to as conformance control. Remediation techniques are selected on the basis of the water source and the method of entry into the wellbore. Conformance control treatments include sealant treatments and relative permeability modifiers (also referred to as disproportionate permeability modifiers).

In previous years, water-soluble chromium (+3) crosslinked polyacrylamide gels have been used in conformance control treatments. The gel time was usually controlled by the addition of materials that chelate with chromium in competition with the polymer-bound carboxylate groups. The crosslinking reactions in these gel systems take place by the complexation of Cr (+3) ions with carboxylate groups on the polymer chains. Because of the nature of the chemical bond between Cr (+3) and the pendant carboxylate groups, formation of insoluble chromium species can occur at high pH values. Other problems with these systems include thermal instability, unpredictable gel time, and gel instability in the presence of chemical species that are potential ligands. Another water-based gel system for conformance control is based on phenol/formaldehyde crosslinker system for homo-, co-, and ter- polymer systems containing acrylamide. The crosslinking mechanism involves hydroxymethylation of the amide nitrogen, with the subsequent propagation of crosslinking by multiple alkylation on the phenolic ring. Because of the nature of this chemical bond, the gel time is controllable over a wide temperature range. Although these gels work well, phenol and formaldehyde are highly toxic.

U.S. Pat. No. 5,836,392 discloses a system based on a polyethyleneimine (PEI) crosslinker and a copolymer of acrylamide and t-butyl acrylate (PA-t-BA). PEI is such a low-toxicity material that the Food and Drug Administration has approved it in the United States for food contact. Although non-toxic, PEI can bio-accumulate or persist in the environment for long periods.

It has been shown that chitosan can be used in place of polyethyleneimine to crosslink acrylamide based polymers. Chitosan's usefulness as a crosslinker has been limited, however, by its relative poor solubility in aqueous solutions. For example, commercial sources of chitosan are only sparingly soluble in water; about 1–2% active solutions are the highest concentrations that can be made while maintaining usable viscosity. While this is a step forward in the effort to provide more environmentally acceptable systems, the major component, or base polymer, of such a gel system is still a non-biodegradable polymer. The major component of such gel system is generally a homopolymer or copolymer of acrylate-type monomers, such as acrylic acid, acrylamide, vinylpyrrolidone etc. The backbone of such polymers contains continuous carbon-carbon single bonds, which are of poor biodegradability. Since the chitosan crosslinker is only a minor component of the gel composition, the total system is still predominantly non-biodegradable due to poor biodegradability of the synthetic base polymer.

SUMMARY OF THE INVENTION

The present invention provides a well treatment fluid for use in a well, the well treatment fluid comprising water; an amine-based polymer; a polysaccharide-based polymer; and an oxidizing agent that is capable of at least partially oxidizing at least the polysaccharide-based polymer.

The present invention also provides a method of treating a subterranean formation penetrated by a wellbore, the method comprising the steps of: (a) forming a well treatment fluid comprising water; an amine-based polymer; a polysaccharide-based polymer; and an oxidizing agent that is capable of at least partially oxidizing at least the polysaccharide-based polymer; and (b) contacting the well treatment fluid with the subterranean formation.

The present invention also provides a method of treating a subterranean formation penetrated by a wellbore, the method comprising the steps of: (a) forming a well treatment fluid comprising water; an amine-based polymer; and a polysaccharide-based polymer; (b) contacting the subterranean formation with the well treatment fluid; and (c) contacting an oxidizing agent that is capable of at least partially oxidizing at least the polysaccharide-based polymer with the subterranean formation.

These and other embodiments of the present invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims. The compositions can comprise, consist essentially of, or consist of the stated materials. The method can comprise, consist essentially of, or consist of the stated steps with the stated materials.

DETAILED DESCRIPTION

The present invention provides a well treatment fluid for use in a well, the well treatment fluid comprising water, an amine-based polymer, a polysaccharide-based polymer, and an oxidizing agent that is capable of at least partially oxidizing at least the polysaccharide-based polymer. The well treatment fluid of the present invention is useful as a well drilling and servicing fluid in various operations such as drilling, fracturing, sand control, lost circulation control, completion, conformance control, work over, and the like.

The well treatment fluid relates to aqueous conformance control fluids and treatments. The water for use in the well treatment fluid can be of any convenient source, including fresh water, seawater, natural brine, formulated brine, 2%

KCl solution, and any combination in any proportion thereof. Formulated brine is manufactured by dissolving one or more soluble salts in water, natural brine or seawater. Representative soluble salts are the chloride, bromide, acetate and formate salts of potassium, sodium, calcium, magnesium and zinc. The preferred water for the well treatment fluid is 2% KCl solution or seawater.

The amine-based polymer comprises at least one member selected from the group of chitosan, chitosan salts, oxidized chitosan, poly(vinyl alcohol-vinyl amine), polylysine, polyethyleneimine, and any combination in any proportion thereof. Preferably, the amine-based polymer comprises a chitosan-based polymer. The chitosan-based polymer can comprise chitosan, chitosan salts, oxidized chitosan, and any combination in any proportion thereof. The chitosan-based polymers preferably have pendant amino groups on the polymer which can react with the carbonyl group of the oxidized polysaccharides. The pendant amino group may be a primary or secondary amine. Occasionally, a pendant amine may be a part of a branched structure of a polymer. Examples of such polymers which are useful in the present invention include polyethyleneimine. Poly(vinyl alcohol vinyl amine) polymers, also referred to as vinylalcohol/vinylamine copolymers are available, for example, from ERKOL Corp. of Tarragona Spain. The mole % vinylamine present in the polymer may range from about 1 to about 50% and the molecular weight of the polymer may be in the range of from about 10,000 to about 150,000. Although chitosan has been used in aqueous conformance control, its usefulness has been severely limited by its relative poor solubility in water. Chitosan is a beta-(1→4)-polysaccharide of D-glucosamine, and is structurally similar to cellulose, except that the C-2 hydroxyl group in cellulose is substituted with a primary amine group in chitosan. Chitosan occurs in nature in small amounts and is biodegradable. Chitosan degrading enzymes, namely chitinases, chitosanases, and lysozymes that degrade chitin-derived materials occur in bacteria, fungi, algae, mammals, birds, fish, etc. In-house Biochemical-Oxygen-Demand (BOD) and Chemical-Oxygen-Demand (COD) tests show a BOC/COD of 54% compared to 32% for HEC (according to HACH Method 8000 that is described in the HACH Water Analysis Handbook, 3rd ed., Hach Company (1997)).

Chitosan is produced by partial or complete deacetylation of chitin. Chitin is a naturally occurring polysaccharide, which is the second most abundant natural product on earth preceded only by cellulose. Structurally, chitin is a polysaccharide consisting of beta-(1→4)2-acetamido-2-deoxy-D-glucose units, some of which are deacetylated. Chitin is not one polymer with a fixed stoichiometry, but a class of polymers of N-acetylglucosamine with different crystal structures and degrees of deacetylation and with fairly large variability from species to species. Typically, chitosan has a degree of deacetylation that is between 50% and 100%. The degree of deacetylation in the commercially available chitosan is usually in the 70% to 78% range.

The large number of free amine groups (pKa=6.3) makes chitosan a polymeric weak base. However, because chitosan is a polysaccharide containing many primary amine groups, it forms water-soluble salts with many organic and inorganic acids. For example, chitosan is somewhat more soluble in dilute aqueous acids, usually carboxylic acids, as the chitosonium salt. Nevertheless, the solubility of chitosan in acidified water, for example in acetic or hydrochloric acid, is still only in the 1 to 2% range. If the pH of the solution is increased above 6.0, polymer precipitation occurs, thus limiting its solubility. The viscosity of the aqueous chitosan solution depends on the molecular weight of the polymer.

In an advantageous embodiment, the present invention employs an oxidized chitosan-based polymer to overcome the relative poor solubility of chitosan. The oxidized chitosan-based polymer can be prepared by oxidizing the chitosan-based polymer selected from the group consisting of chitosan, chitosan salts, and any combination in any proportion thereof. The oxidized chitosan-based polymer can serve both as a crosslinker and base polymer to the oxidized polysaccharide-based polymer. Some examples of chitosan-based polymers suitable for oxidation in the present invention include chitosan, chitosan salts with mineral and organic acids, and any combination in any proportion thereof. Some commercial examples of chitosan include Chitosan Lactate available from Vanson HaloSource and Hydagen® HCMF available from Cognis.

To oxidize the chitosan-based polymer, a wide variety of oxidizers can be used. Examples of oxidizers include sodium hypochlorite, sodium periodate, hydrogen peroxide, peracetic acid, and any mixtures in any proportion thereof. Other oxidizers include alkali, alkaline earth and transition metal salts of periodate, hypochlorite, perbromate, chlorite, chlorate, hydrogen peroxide, soluble peroxide salts, persulfate salts, percarboxylic acids, oxyhalo acids, and any combination in any proportion thereof. The selection of the oxidizer and the concentration of oxidizer should be sufficient to oxidize or degrade the chitosan-based polymer to a desired solubility. Oxidizing the chitosan-based polymer increases its solubility. Without being limited by the theoretical explanation, the oxidation of the chitosan-based polymer divides the polymer into shorter chain segments, thus increasing its solubility. Increased solubility of the chitosan-based polymer may also be explained by the introduction of carboxyl groups. By increasing solubility of the chitosan-based polymer, it can be used in higher concentration in fluids, thereby utilizing it as the base polymer in the fluids, rather than merely as a crosslinker.

The oxidizing agent is capable of oxidizing at least a portion of the chitosan-based polymer and/or the polysaccharide-based polymer which then allows at least a portion of them to crosslink in the water. It should also be understood by those skilled in the art that the oxidizing agent is capable of oxidizing at least a portion of the chitosan-based polymer which then allows at least a portion of it to partially self-crosslink in the water. Further, the oxidizing agent is capable of oxidizing at least a portion of the polysaccharide-based polymer which allows at least a portion of it to partially self-crosslink in the water. Still further, the oxidizing agent is also capable of oxidizing at least a portion of the polysaccharide-based polymer to form an oxidized polysaccharide-based polymer and at least a portion to crosslink with at least a portion of the chitosan-based polymer in the water. The oxidizing agent is also capable of oxidizing at least a portion of the chitosan-based polymer to form an oxidized chitosan-based polymer and is capable of oxidizing at least a portion of the polysaccharide-based polymer to form an oxidized polysaccharide-based polymer, such that at least a portion of the oxidized chitosan-based polymer can crosslink with at least a portion of the oxidized polysaccharide-based polymer in the water to produce a gel having a viscosity of greater than or equal to about 20 cp when measured at a pH of about 4 to about 7 and at STP. Any and all such polymers listed above can exist together in water to form a gel having a viscosity of greater than or equal to about 20 cp, which is measured at a pH of about 4 to about 7 and at STP. Gels ranging from stiff and ringing type to "lipping" gels can be obtained.

Examples of polysaccharide-based polymers for use in the well treatment fluid of the present invention include a polysaccharide-based polymer selected from the group consisting of starch, cellulose, agarose, partially-acetylated cellulose, hydroxyl ethyl cellulose, gum, and any combination in any proportion thereof. Preferably, the gum is selected from the group consisting of guar, locust bean gum, gum arabic, tragacanth, gutta percha, xanthan salts, alginate salts, carrageenan, scleroglucan, and any combination in any proportion thereof.

Preferably, the polysaccharide-based polymer of the well treatment fluid comprises starch. Starch $(C_6H_{10}O_5)_n$, is a mixture of linear (amylose) and branched (amylopectin) polymers of $\alpha$-D-glucopyranosyl units. It is a principal reserve polysaccharide in plants, and constitutes a substantial portion of the human diet; thus it is a biodegradable option for well treatment fluids. Starch suitable for oxidation as in the present invention can include a number of starch-based polymers. In one embodiment, the starch is selected from the group consisting of corn starch, potato starch, waxy maize, dextrinized starch and any mixtures in any proportion thereof. Additionally, the starches may be modified chemically prior to oxidation. Examples of such starches include cationic starches, hydroxyethylated starches, hydroxypropylated starches, carboxylated starches and the like.

The extent that the polysaccharide-based polymer, such as starch, is oxidized can be controlled by, for example, the amount of oxidizer added, the duration of the oxidation process and the temperature of reaction. For example, the amount of oxidizing agent can be adjusted such that about 1% to about 25% of the glucose units of the polysaccharide-based polymer undergoes oxidation. A variety of oxidizers can be used to oxidize the starch, including oxidizers selected from the group consisting of alkali, alkaline earth and transition metal salts of, for example, periodate, hypochlorite, perbromate, chlorite, chlorate, hydrogen peroxide, peracetic acid, soluble peroxide salts, persulfate salts, percarboxylic acids, oxyhalo acids, and combination in any proportion thereof.

Without being limited by any theoretical explanation, it is believed that oxidation of the polysaccharide-based polymer introduces carbonyl groups, which are reactive groups that enable crosslinking with the chitosan-based polymer in water. Thus, the oxidized polysaccharide-based polymer can include a number of carbonyl-based functional groups such as aldehydes, anhydrides, carboxyl groups, ketones and esters. The chitosan-based polymer includes an amino nucleophile bearing an electron pair, thus enabling it to react or crosslink with the carbonyl groups of the oxidized polysaccharide-based polymer. The terms nucleophile and nucleophilic refer to a negative ion or neutral molecule, such as a primary or secondary amine group on the chitosan-based polymer, which brings an electron pair into a chemical reaction with another electron accepting reactive group or positive ion, called an electrophile. An electrophile, such as the oxidized polysaccharide-based polymer having or modified to have carbonyl groups is capable of accepting the electron pair, thereafter forming a covalent bond. With respect to starch, it is believed that oxidation of the hydroxyl groups of C-2, C-3 and C-6 carbons of the glucose units in the starch gives electrophilic functional groups such as aldehydes, ketones, or carboxylic acids, which react with nucleophiles such as chitosan-based polymers.

The concentration of the polysaccharide-based polymer and chitosan-based polymer in the fluids is selected to be sufficient to impart to the fluids the rheological characteristics desired. The weight ratio of chitosan-based polymer to polysaccharide is from about 50:1 to about 1:50. In one advantageous embodiment that uses starch as the polysaccharide-based polymer, the chitosan-based polymer includes an oxidized chitosan-based polymer that is present in the amount of at least 3 wt % by weight of the composition. Preferably, the oxidized chitosan-based polymer is present in an amount up to about 10 wt % by weight of the composition. At such high concentration in the well treatment fluid, the oxidized chitosan-based polymer serves as the base polymer. The oxidized starch, in turn, serves as a crosslinker to the oxidized chitosan-based polymer. In one embodiment, the starch is present in the amount from up to about 10 wt % of the composition. In such embodiments, the chitosan-based polymer serves as a crosslinker to the oxidized starch. In one aspect, the weight ratio of the starch to chitosan-based polymer is from about 30:1 to about 1:30. Thus, the oxidized chitosan-based polymer can serve both as a crosslinker and a base polymer to the oxidized polysaccharide-based polymer. The chitosan-based polymer/polysaccharide-based polymer combination provides an environmentally acceptable system since both the crosslinker and the major component are natural, non-toxic polymers.

Since chitosan-based polymers are typically more expensive than starch, the economic aspects of bio-degradability can be improved by using starch as the base polymer and either a substantially biodegradable poly(vinyl alcohol-vinyl amine), also commonly known as polyvinylalcoholvinylamine, or a biodegradable chitosan-based polymer as the crosslinker. It is understood by those skilled in the art that both the chitosan-based polymer and the polysaccharide-based polymer can serve as a crosslinker. The polymer in lower concentration serves as a crosslinker to the polymer in higher concentration. However in the case of chitosan, because the non-oxidized chitosan-based polymer is of low solubility, the chitosan-based polymer must be oxidized to serve as the base polymer, or polymer of higher concentration.

To further illustrate the present invention, and not by way of limitation, the following examples are provided.

EXAMPLE 1

Table 1 provides the results obtained with oxidized starch and chitosan. The gel times are controlled by the degree of oxidation and the base polymer to cross-linker ratio, as well as the pH and temperature.

TABLE 1

| Chitosan concentration in 1% acetic solution | % starch oxidation | Chitosan to oxidized starch ratio (wt %) | pH | Temperature (° F.) | Gel Time (Hr:min) |
|---|---|---|---|---|---|
| 1% | 19 | 2:1 | 5 | 175 | 1:30 |
| 1% | 12.5 | 2:1 | 5 | 175 | 8 hrs |

EXAMPLE 2

To improve the relative overall bio-degradability of the gel compositions, starch was oxidized to different degrees to introduce carbonyl groups, and the resulting products were reacted with chitosan and oxidized chitosan. Initial experiments were directed to using oxidized chitosan as the base polymer and the oxidized starch as the crosslinker. The compositions yielded gels and the results are presented in Table 2. The degree of starch oxidation also effected the gel time. For example, when the degree of starch oxidation is high (higher level of carbonyl formation), the gel time is shorter than when the degree of oxidation is low.

TABLE 2

| Starch/Oxidizer[1] Weight Ratio | % Chitosan/ % Starch | Temp. (° F.) | pH | Gel Time (HRS) |
|---|---|---|---|---|
| 50/1 | 5/2 | 160 | 4.9 | 1 |
| 50/1 | 5/1.5 | 160 | 4.9 | None in 65 hrs |
| 36/1 | 5/2 | 160 | 4.9 | 4.8 |
| 36/1 | 5/1.5 | 160 | 4.9 | 23 |
| 36/1 | 5/1 | 160 | 4.9 | None in 63 hrs |
| 50/1 | 5/2 | 190 | 4.9 | 5 |
| 50/1 | 5/1.6 | 190 | 4.9 | 11 |
| 50/1 | 5/1.5 | 160 | 4.9 | None in 65 hrs |
| 50/1 | 5/1.5 | 190 | 4.9 | 22 |
| 50/1 | 5/1.3 | 190 | 4.9 | 24 |

[1]sodium periodate was used as the oxidizer.

EXAMPLE 3

The results of using oxidized starch as the base polymer and the oxidized and non-oxidized, chitosan-based polymers as crosslinkers are shown in Table 3. The results indicate that the ratio of the base polymer to crosslinker as well as the concentration of the two components may be used to optimise the gel time.

TABLE 3

Oxidized Starch as the Base Polymer and Oxidized/Nonoxidized Chitosan as the Crosslinker

| Sample | Crosslinker | % Starch/ % Chitosan | Temp. (F) | Gel Time (Hrs) |
|---|---|---|---|---|
| 1 | Nonoxidized Chitosan | 8/0.2 | 180 | None in 3 day |
| 2 | Nonoxidized Chitosan | 2/0.8 | 180 | <than 45 min |
| 3 | Oxidized Chitosan[1] | 7/2 | 180 | No gel in 4 days |
| 4 | Oxidized Chitosan | 4.9/4.9 | 180 | <30 minutes |
| 5 | Oxidized Chitosan | 5/2 | 180 | <30 minutes |
| 6 | Oxidized Chitosan | 5/1 | 180 | No gel in 4 days |

[1]Chitosan was oxidized with hydrogen peroxide in a suspension at elevated temperature followed by acidification with acetic acid

EXAMPLE 4

One hundred fifty grams of a 30% solution of cationic starch available from Halliburton as FDP C662 was mixed with 10 grams of 1% chitosan solution in 1% acetic acid. Into 42 grams (40 ml) of the solution mixture, 0.14 grams of 10% sodium periodate solution was added and shaken vigorously. The gel time of the mixture was measured by Brookfield viscometer using #3 spindle and 10 rpm spinning rate at 150° F. The time required for the viscosity of the mixture to increase to 5000 centipoise was designated as the gel time (Entry #1 in Table 4). The other experiments in Table 4 were repeated using different amounts of starch, chitosan and the oxidizing agent as shown.

Table 4 illustrates the gel time for a treatment fluid of starch base polymer and chitosan with in-situ modification using periodate salt as an in situ oxidizer. The starch was used as a base polymer and the chitosan was used as a crosslinker at weight ratio of 15:1. The treatment fluid was prepared in fresh water.

TABLE 4

Gel Times in Fresh water for Starch Base Polymer/Chitosan Crosslinker With In-Situ Modification (Base Polymer to Crosslinker Ratio = 15:1)

| % Starch in Total Composition | % Chitosan in Total Composition | Total Polymer to NaIO$_4$ Ratio | Temp. (° F.) | Gel Time |
|---|---|---|---|---|
| 10 | 0.67 | 320:1 | 150 | 40 |
| 10 | 0.67 | 320:1 | 160 | 32 |
| 10 | 0.67 | 320:1 | 170 | 20.4 |
| 10 | 0.67 | 320:1 | 180 | 13.7 |
| 10 | 0.67 | 160:1 | 150 | 29 |
| 9 | 0.56 | 54:1 | 150 | 13 |
| 5 | 0.33 | 67:1 | 150 | No gel |
| 10 | 0 | 300:1 | 160 | No gel[1] |
| 0 | 0.67 | 4.2:1 | 160 | No gel[2] |

[1]The viscosity of the mixture at room temperature was greater than 100 centipoise immediately after mixing
[2]The viscosity of the mixture was greater than 30 centipoise after mixing The degree of oxidation of the polysaccharide-based polymer can be used to control gel time. In the case where chitosan is used as the crosslinker or base polymer, the degree of oxidation of chitosan can also be used to control the gel time. Besides the degree of oxidation, a number of other variables can be used to control gel time, or impact the gelling of the oxidized or non-oxidized, chitosan-based polymer with the oxidized polysaccharide-based polymers, irrespective of which serves as the crosslinker. Such variables include type of polysaccharide-based polymer, crosslinker concentration, pH of the gel system, mix water, application temperature and chitosan modification.

In comparing the ability of the oxidized polysaccharide-based polymers to crosslink or react with the oxidized/non-oxidized, chitosan-based polymer, the order of ease of crosslinking reactivity may be effected by steric resistance to the approach of the amino group of the oxidized/non-oxidized chitosan.

Yet another variable that can be used to control gel time is the pH of the gel system. The crosslinking reaction proceeds slower with decreasing pH of the gel system. This observation is in accordance with expectations for amine-type crosslinkers, such as oxidized/non-oxidized, chitosan-based polymers. Without being limited by theory, it is believed that the lone pair of electrons on the amine nitrogen groups of the chitosan-based polymer is expected to be protonated in acidic media, thus making them unavailable to initiate a nucleophilic attack on the oxidized polysaccharide-based polymer. Therefore, varying the pH of the gel system can by used to control gel time.

Still another variable that can be used to control gel time is the mix water, which is believed to effect the crosslinking reaction. The crosslinking reaction can proceed significantly faster in fresh water compared to seawater.

Therefore, gel time can be controlled by variables that include the degree of oxidation of the polysaccharide-based polymer, the pH of the solution, and base polymer/crosslinker ratio and the corresponding solution concentrations.

In high temperature applications, it can be more advantageous to use the oxidized chitosan-based polymer as a crosslinker because non-oxidized, chitosan-based polymers have very short gel times at high temperatures. It is difficult to achieve practical gel times with non-oxidized, chitosan-based polymers at such temperatures. It should be noted that gel time with the oxidized chitosan-based polymer appears to be more strongly influenced by temperature than polymer/crosslinker ratios, or the corresponding concentrations especially at temperatures higher than 200° F., which may be indicative of the sterically hindered environment of the amino group in the oxidized chitosan-based polymer. The chitosan-based polymer/polysaccharide gel system has thermal stability in the temperature range applicable to many conformance-related applications, making it commercially useful.

The well treatment fluid of this invention generally will contain materials to provide various characteristics of properties to the fluid. Thus, the well treatment fluid can contain one or more viscosifiers or suspending agents in addition to the chitosan-based polymer, weighting agents, proppants, corrosion inhibitors, soluble salts, biocides, fungicides, seepage loss control additives, bridging agents, deflocculants, lubricity additives, shale control additives, pH control additives, and other additives as desired. The well treatment fluid can also contain one or more materials that function as encapsulating or fluid loss control additives to restrict the entry of liquid from the fluid to the contacted shale. Representative materials include partially solubilized starch, gelatinized starch, starch derivatives, cellulose derivatives, humic acid salts (lignite salts), lignosulfonates, gums, biopolymers, synthetic water soluble polymers, and mixtures thereof. If desired, water-soluble potassium salts can be incorporated into the fluids of this invention to increase the potassium ion content thereof. Other materials that may be added to fluids to enhance the shale stabilizing characteristics of the fluids are potassium chloride, potassium formate, and potassium acetate.

Mixtures of polysaccharide-based polymers, chitosan-based polymers, and oxidized agent can be prepared for addition to the well treatment fluid of this invention for maintenance of the properties thereof, or indeed, for preparing the initially prepared oil and gas well drilling and servicing fluids before adding the fluids of the present invention thereof. By oxidizing in situ, the polysaccharide-based polymer and crosslinking such polymer with a chitosan-based polymer, a treatment fluid made entirely of biodegradable material can be achieved. Furthermore, by oxidizing the chitosan-based polymer, the solubility of the chitosan-based polymer is increased so as to enable the chitosan-based polymer to be used in higher concentration in the treatment fluid, while still retaining the reactivity of the chitosan-based polymer.

As indicated above, the treatment fluid in the present invention is useful in drilling a well wherein there is circulated in a wellbore (borehole) a drilling fluid during the drilling thereof The well treatment fluid of this invention is circulated or spotted within a borehole during well drilling or servicing operations. The well treatment fluid can be formulated to provide viscous gels to overcome lost circulation problems in a wellbore.

The improved method of the present invention provides a method of treating a subterranean formation penetrated by a wellbore, the method comprising the steps of: (a) forming a well treatment fluid comprising water; an amine-based polymer; a polysaccharide-based polymer; and an oxidizing agent that is capable of at least partially oxidizing at least the polysaccharide-based polymer; and (b) contacting the well treatment fluid with the subterranean formation. The well treatment fluid can be formed prior to contacting the subterranean formation. After the well treatment fluid contacts the subterranean formation, a second oxidizing agent that is capable of at least partially oxidizing at least the polysaccharide-based polymer can be introduced to the subterranean formation. The second oxidizing agent may be the same or different from the oxidizing agent of the well treatment fluid.

The present invention also provides an improved method of treating a subterranean formation penetrated by a wellbore, the method comprising the steps of: (a) forming a well treatment fluid comprising water; an amine-based polymer; and a polysaccharide-based polymer; (b) contacting the subterranean formation with the well treatment fluid; and (c) contacting an oxidizing agent that is capable of at least partially oxidizing at least the polysaccharide-based polymer with the subterranean formation. In one embodiment of the present invention, the chitosan-based polymer crosslinks with the oxidized polysaccharide-based polymer prior to contacting subterranean formation. In this embodiment, the polysaccharide-based polymer is oxidized in a mixing tank just prior to contacting the formation. It should be understood by those skilled in the art that the polysaccharide-based polymer need not be oxidized prior to contact with the formation. The oxidizing agent can be injected into the formation along with, prior to, or after the chitosan-based polymer and polysaccharide-based polymer are injected into the formation. Thus, the polysaccharide-based polymer is oxidized either under downhole conditions or in a mixing tank just prior to contacting the formation.

When the polysaccharide-based polymer is oxidized on the fly, the polysaccharide-based polymer can advantageously be mixed and stored together with the chitosan-based polymer. Oxidation on the fly eliminates the need to separately stock the polymers because the inactivated or unoxidized polysaccharide-based polymer does not react with the amino groups of the chitosan-based compound and form crosslinked gels until it is later oxidized in the mixing tank or in the formation. The ability to store the two polymers together saves cost in the process. Further, the polysaccharide-based polymer in its unoxidized state is less expensive than the oxidized polysaccharide-based polymer.

After careful consideration of the specific and exemplary embodiments of the present invention described herein, a person of ordinary skill in the art will appreciate that certain modifications, substitutions and other changes can be made without substantially deviating from the principles of the present invention. The detailed description is illustrative, the spirit and scope of the invention being limited only by the appended Claims.

What is claimed is:

1. A well treatment fluid for use in a well, the well treatment fluid comprising:
   (a) water;
   (b) an amine-based polymer, wherein the amine-based polymer comprises a chitosan-based polymer;
   (c) a polysaccharide-based polymer; and
   (d) an oxidizing agent that is capable of at least partially oxidizing at least the polysaccharide-based polymer.

2. A method of treating a subterranean formation penetrated by a wellbore, the method comprising the steps of:
   (a) forming a well treatment fluid comprising:
      (i) water;
      (ii) an amine-based polymer;
      (iii) a polysaccharide-based polymer; and
      (iv) an oxidizing agent that is capable of at least partially oxidizing at least the polysaccharide-based polymer;

(b) contacting the well treatment fluid with the subterranean formation; and (c) contacting the well treatment fluid with a second oxidizing agent that is capable of at least partially oxidizing at least a portion of the polysaccharide-based polymer within the subterranean formation after the well treatment fluid contacts the subterranean formation, which second oxidizing agent may be the same or different from the oxidizing agent of the well treatment fluid.

3. The method according to claim 2, wherein the step of forming the well treatment fluid is prior to contacting the subterranean formation.

4. A method of treating a subterranean formation penetrated by a wellbore, the method comprising the steps of:
   (a) forming a well treatment fluid comprising:
      (i) water;
      (ii) an amine-based polymer; wherein the amine-based polymer comprises at least one member selected from the group of chitosan, chitosan salts, oxidized chitosan, poly(vinyl alcohol-vinyl amine), polylysine, polyethyleneimine, and any combination in any proportion thereof.
      (iii) a polysaccharide-based polymer; and
      (iv) an oxidizing agent that is capable of at least partially oxidizing at least the polysaccharide-based polymer; and
   (b) contacting the well treatment fluid with the subterranean formation.

5. A method of treating a subterranean formation penetrated by a wellbore, the method comprising the steps of:
   (a) forming a well treatment fluid comprising:
      (i) water;
      (ii) an amine-based polymer; wherein the amine-based polymer comprises a chitosan-based polymer,
      (iii) a polysaccharide-based polymer; and
      (iv) an oxidizing agent that is capable of at least partially oxidizing at least the polysaccharide-based polymer; and
   (b) contacting the well treatment fluid with the subterranean formation.

6. The method of claim 5, wherein the chitosan-based polymer comprises chitosan, chitosan salts, oxidized chitosan, or any combination of the foregoing in any proportion thereof.

7. The method of claim 5, wherein the chitosan-based polymer comprises an oxidized chitosan-based polymer.

8. The method of claim 7, wherein the oxidized chitosan-based polymer is prepared by oxidizing a chitosan-based polymer selected from the group consisting of chitosan, chitosan salts, or any combination thereof in any proportion.

9. The method of claim 8, wherein the oxidized chitosan-based polymer is prepared by oxidizing a chitosan-based polymer with an oxidizer selected from the group consisting of sodium hypochlorite, sodium periodate, hydrogen peroxide, peracetic acid, and any mixture thereof in any proportion thereof.

10. The method of claim 8, wherein the oxidized chitosan-based polymer is present in an amount of at least 3 wt % by weight of the composition.

11. The method of claim 8, wherein the oxidized chitosan-based polymer is present in an amount of up to about 10 wt % by weight of the composition.

12. The method of claim 5, wherein the weight ratio of the amine-based polymer to polysaccharide-based polymer is from about 50:1 to about 1:50.

13. The method of claim 5, wherein the polysaccharide-based polymer is selected from the group consisting of starch, cellulose, agarose, partially-acetylated cellulose, hydroxyl ethyl cellulose, gum, and any combination in any proportion thereof.

14. The method of claim 13, wherein the gum is selected from the group consisting of guar, locust bean gum, gum arabic, tragacanth, gutta percha, xanthan salts, alginate salts, carrageenan, scleroglucan, and any combination in any proportion thereof.

15. The method of claim 5, wherein the polysaccharide-based compound is starch.

16. The method of claim 15, wherein the starch is present in an amount up to about 10 wt % by weight of the composition.

17. The method according to claim 15, wherein the weight ratio of the starch to the amine-based polymer is from about 30:1 to about 1:30.

18. The method of claim 5, wherein the oxidizing agent is capable of oxidizing the chitosan-based polymer and the polysaccharide-based polymer which then allows them to crosslink in the water to produce a gel having a viscosity of greater than or equal to about 20 cp when measured at a pH of about 4 to about 7 and at STP.

19. The method of claim 5, wherein the oxidizing agent is capable of oxidizing the chitosan-based polymer to allow the oxidized polymer to at least partially self-crosslink in the water to produce a gel having a viscosity of greater than or equal to about 20 cp when measured at a pH of about 4 to about 7 and at STP.

20. The method of claim 5, wherein the oxidizing agent is capable of oxidizing the polysaccharide-based polymer to allow the oxidized polysaccharide to at least partially self-crosslink in the water to produce a gel having a viscosity of greater than or equal to about 20 cp when measured at a pH of about 4 to about 7 and at STP.

21. The method of claim 5, wherein the oxidizing agent is capable of oxidizing the polysaccharide-based polymer to form an oxidized polysaccharide-based polymer and at least a portion thereof crosslinks with the chitosan-based polymer in the water to produce a gel having a viscosity of greater than or equal to about 20 cp when measured at a pH of about 4 to about 7 and at STP.

22. The method of claim 5, wherein the oxidizing agent is capable of oxidizing at least a portion of the chitosan-based polymer to form an oxidized chitosan-based polymer and is capable of oxidizing at least a portion of the polysaccharide-based polymer to form an oxidized polysaccharide-based polymer, and at least a portion of the oxidized chitosan-based polymer crosslinks with at least a portion of the oxidized polysaccharide-based polymer in the water to produce a gel having a viscosity of greater than or equal to about 20 cp when measured at a pH of about 4 to about 7 and at STP.

23. The method of claim 5, wherein the oxidizing agent is selected from the group consisting of alkali, alkaline earth and transition metal salts of periodate, hypochlorite, perbromate, chlorite, chlorate, hydrogen peroxide, soluble peroxide salts, persulfate salts, percarboxylic acids, oxyhalo acids, and any combination thereof in any proportion thereof.

24. A method of treating a subterranean formation penetrated by a wellbore, the method comprising the steps of:
   (a) forming a well treatment fluid comprising:
      (i) water;
      (ii) an amine-based polymer; and
      (iii) a polysaccharide-based polymer;

(b) contacting the subterranean formation with the well treatment fluid; and (c) contacting the subterranean formation with an oxidizing agent that is capable of at least partially oxidizing at least a portion of the polysaccharide-based polymer in contact with said formation.

25. The method of claim 24 wherein the amine-based polymer comprises at least one member selected from the group of chitosan, chitosan salts, oxidized chitosan, poly (vinyl alcohol-vinyl amine), polylysine, polyethyleneimine, and any combination in any proportion thereof.

26. The method of claim 24 wherein the amine-based polymer comprises a chitosan-based polymer.

27. The method of claim 26 wherein the chitosan-based polymer comprises chitosan, chitosan salts, oxidized chitosan, or any combination of the foregoing in any proportion thereof.

28. The method of claim 27 wherein the chitosan-based polymer comprises an oxidized chitosan-based polymer.

29. The method of claim 28 wherein the oxidized chitosan-based polymer is prepared by oxidizing a chitosan-based polymer selected from the group consisting of chitosan, chitosan salts, or any combination thereof in any proportion.

30. The method of claim 28 wherein the oxidized chitosan-based polymer is prepared by oxidizing a chitosan-based polymer with an oxidizer selected from the group consisting of sodium hypochlorite, sodium periodate, hydrogen peroxide, peracetic acid, and any mixture thereof in any proportion thereof.

31. The method of claim 28 wherein the oxidized chitosan-based polymer is present in an amount of at least 3 wt % by weight of the composition.

32. The method of claim 28, wherein the oxidized chitosan-based polymer is present in an amount of up to about 10 wt % by weight of the composition.

33. The method according to claim 28 wherein the weight ratio of the oxidized chitosan-based polymer to polysaccharide-based polymer is from about 50:1 to about 1:50.

34. The method of claim 24 wherein the polysaccharide-based polymer is selected from the group consisting of starch, cellulose, agarose, partially-acetylated cellulose, hydroxyl ethyl cellulose, gum, and any combination in any proportion thereof.

35. The method of claim 34 wherein the gum is selected from the group consisting of guar, locust bean gum, gum arabic, tragacanth, gutta percha, xanthan salts, alginate salts, carrageenan, scleroglucan, and any combination in any proportion thereof.

36. The method of claim 24 wherein the polysaccharide-based compound is starch.

37. The method of claim 36 wherein the starch is present in an amount up to about 10 wt % by weight of the composition.

38. The method of claim 36 wherein the weight ratio of the starch to the amine-based polymer is from about 30:1 to about 1:30.

39. The method of claim 26 wherein the oxidizing agent is capable of oxidizing at least a portion of the chitosan-based polymer and the polysaccharide-based polymer which them allows them to at least partially crosslink in the water to produce a gel having a viscosity of greater than or equal to about 20 cp when measured at a pH of about 4 to about 7 and at STP.

40. The method of claim 26 wherein the oxidizing agent is capable of oxidizing at least a portion of the chitosan-based polymer to allow the oxidized chitosan to at least partially self-crosslink in the water to produce a gel having a viscosity of greater than or equal to about 20 cp when measured at a pH of about 4 to about 7 and at STP.

41. The method of claim 26 wherein the oxidizing agent is capable of oxidizing the polysaccharide-based polymer to allow at least a portion of the oxidized polysaccharide to at least partially self-crosslink in the water to produce a gel having a viscosity of greater than or equal to about 20 cp when measured at a pH of about 4 to about 7 and at STP.

42. The method of claim 26 wherein the oxidizing agent is capable of oxidizing at least a portion of the polysaccharide-based polymer to form an oxidized polysaccharide-based polymer and at least a portion thereof crosslinks with the chitosan-based polymer in the water to produce a gel having a viscosity of greater than or equal to about 20 cp when measured at a pH of about 4 to about 7 and at STP.

43. The method of claim 26 wherein the oxidizing agent is capable of oxidizing at least a portion of the chitosan-based polymer to form an oxidized chitosan-based polymer and is capable of oxidizing at least a portion of the polysaccharide-based polymer to form an oxidized polysaccharide-based polymer, and at least a portion of the oxidized chitosan-based polymer crosslinks with the oxidized polysaccharide-based polymer in the water to produce a gel having a viscosity of greater than or equal to about 20 cp when measured at a pH of about 4 to about 7 and at STP.

44. The method of claim 24 wherein the oxidizing agent is present in a sufficient concentration to oxidize from about 1% to about 25% of the units of the polysaccharide-based polymer.

45. The method of claim 24 wherein the oxidizing agent is selected from the group consisting of alkali, alkaline earth and transition metal salts of periodate, hypochlorite, perbromate, chlorite, chlorate, hydrogen peroxide, soluble peroxide salts, persulfate salts, percarboxylic acids, oxyhalo acids, and any combination thereof in any proportion thereof.

46. The method of claim 24 wherein the water for the well treatment fluid is selected from the group consisting of fresh water, seawater, natural brine, formulated brine, 2% KCl solution, and any combination thereof in any proportion thereof.

47. The method of claim 5 wherein the oxidizing agent is present in a sufficient concentration to oxidize from about 1% to about 25% of the units of the polysaccharide-based polymer.

* * * * *